United States Patent
Nagahama et al.

(10) Patent No.: US 10,443,765 B2
(45) Date of Patent: Oct. 15, 2019

(54) THREADED JOINT FOR PIPES

(71) Applicant: JFE STEEL CORPORATION, Tokyo (JP)

(72) Inventors: Takuya Nagahama, Handa (JP); Hiroshi Chikatsune, Handa (JP); Kazunari Takahashi, Handa (JP); Masaki Yoshikawa, Handa (JP); Jun Takano, Handa (JP); Masateru Ueta, Handa (JP); Takamasa Kawai, Handa (JP)

(73) Assignee: JFE STEEL CORPORATION, Tokyo (JP)

( * ) Notice: Subject to any disclaimer, the term of this patent is extended or adjusted under 35 U.S.C. 154(b) by 775 days.

(21) Appl. No.: 14/768,661

(22) PCT Filed: Dec. 18, 2013

(86) PCT No.: PCT/JP2013/007431
§ 371 (c)(1),
(2) Date: Aug. 18, 2015

(87) PCT Pub. No.: WO2014/125545
PCT Pub. Date: Aug. 21, 2014

(65) Prior Publication Data
US 2015/0377391 A1 Dec. 31, 2015

(30) Foreign Application Priority Data
Feb. 18, 2013 (JP) .................................. 2013-028659

(51) Int. Cl.
*F16L 15/06* (2006.01)
*F16L 15/00* (2006.01)
*E21B 17/042* (2006.01)

(52) U.S. Cl.
CPC ............ *F16L 15/06* (2013.01); *E21B 17/042* (2013.01); *F16L 15/004* (2013.01)

(58) Field of Classification Search
CPC ................................. F16L 15/06; F16L 15/00
(Continued)

(56) References Cited

U.S. PATENT DOCUMENTS 4,009,893 A * 3/1977 Schatton ............... E21B 17/042
285/110
4,384,737 A * 5/1983 Reusser ................. F16L 15/004
285/334

(Continued)

FOREIGN PATENT DOCUMENTS

EP 2682658 A1 1/2014
JP 2001-165363 A 6/2001
(Continued)

OTHER PUBLICATIONS

Aug. 4, 2015 Notice of Allowance issued in Japanese Patent Application No. 2013-028659.
(Continued)

*Primary Examiner* — Anna M Momper
*Assistant Examiner* — Fannie C Kee
(74) *Attorney, Agent, or Firm* — Oliff PLC

(57) ABSTRACT

A threaded joint for pipes including a pin and a box, characterized in that the relationship 0.05 degrees≤$\theta_{sb}$−$\theta_{sp}$≤2.0 degrees is satisfied, where $\theta_{sb}$ is an angle of an insertion surface of the female thread on the box side relative to a plane perpendicular to an axis of pipe, and $\theta_{sp}$ is an angle of an insertion surface of the male thread, which faces the insertion surface of the female thread, on the pin side relative to the plane perpendicular to the axis of pipe.

6 Claims, 2 Drawing Sheets

(58) Field of Classification Search
USPC .................................. 285/333–334, 355, 390
See application file for complete search history.

(56) References Cited

U.S. PATENT DOCUMENTS

| | | | | |
|---|---|---|---|---|
| 4,984,829 | A | * | 1/1991 | Saigo .................... E21B 17/042 285/334 |
| 6,454,315 | B1 | * | 9/2002 | Yamaguchi .............. B23G 1/22 285/334 |
| 6,485,063 | B1 | | 11/2002 | Olivier |
| 2003/0122378 | A1 | * | 7/2003 | Nagasaku ............. F16L 15/001 285/390 |
| 2003/0132633 | A1 | | 7/2003 | Maeda et al. |
| 2010/0078936 | A1 | | 4/2010 | Nakamura et al. |
| 2012/0119489 | A1 | | 5/2012 | Shcherbakov et al. |
| 2013/0181442 | A1 | | 7/2013 | Sonobe et al. |

FOREIGN PATENT DOCUMENTS

| | | |
|---|---|---|
| JP | 2002-061779 A | 2/2002 |
| JP | 4924614 B2 | 4/2012 |
| JP | 2012-149760 A | 8/2012 |
| WO | 2012/118167 A1 | 9/2012 |

OTHER PUBLICATIONS

Mar. 3, 2016 Search Report issued in European Application No. 13875099.7.
Apr. 1, 2014 Search Report issued in International Patent Application No. PCT/JP2013/007431.

* cited by examiner

THREADED JOINT FOR PIPES

TECHNICAL FIELD

This application is directed to a threaded joint for pipes and, more particularly, to a threaded joint for pipes used to connect pipes such as riser pipes, line pipes, and oil country tubular goods or OCTG that include tubing and casing for prospecting oil and gas wells and producing oil and gas, having high sealability, high compression resistance, and high galling resistance.

BACKGROUND ART

Threaded joints are widely used for connecting steel pipes (may alternatively simply referred to as pipes hereafter) used in oil production equipment such as OCTG. In related art, in order to connect steel pipes used for prospecting and producing oil or gas, standard threaded joints specified in the API (American Petroleum Institute) standard are typically used.

Nowadays, since the depth of crude oil wells and natural gas wells is increasing, and the number of vertical wells, horizontal wells, directional wells, and the like is increasing, the drilling/production environment becomes more demanding. Development of wells in severe environments such as ocean and polar region is also increasing. Thus, there are diversified requirements for performance of threaded joints such as compression resistance, bending resistance, and seal performance of external pressure. For this reason, so-called premium joints, which are high-performance special threaded joints, are more frequently used, and requirements for performance of the premium joints are also increasing.

The premium joint generally has a tapered thread, a metal-to-metal seal, and a torque shoulder. The tapered thread is an important part for tightly securing the joint for pipes. The metal-to-metal seal is used to reliably maintain sealability by metal-to-metal contact of a box component and a pin component with each other. The box component forms a female side of the threaded joint and the pin component forms a male side of the threaded joint. The torque shoulder serves as a shoulder surface that functions as an abutment during tightening of the joint.

FIGS. 3 to 5 are schematic diagrams of a related-art coupling type premium joint for OCTG, illustrating longitudinal sectional views of the cylindrical threaded joint. The threaded joint includes a pin 3 as a male member and a box 1 as a female member facing the pin 3.

The pin 3 has a male thread 7 on the outer surface thereof and a nose 8. The nose 8 is a non-threaded portion provided at a tip end of the pin 3 adjacent to the male thread 7. The nose 8 has a metal-to-metal seal (may alternatively be referred to as a pin seal) 11 on the outer circumferential surface thereof and a torque shoulder (may alternatively be referred to as a pin shoulder) 12 on the end surface thereof.

The box 1 facing the pin 3 has on the inner surface thereof a female thread 5, a metal-to-metal seal (may alternatively referred to as a box seal) 13, and a torque shoulder (may also be referred to as a box shoulder) 14, which are respectively screwed together with or in contact with the male thread 7, the metal-to-metal seal 11, and the torque shoulder 12 of the pin 3.

When pipes are installed in wells, the pipes are usually rotated during the work. When drilling in a horizontal or inclined direction, the pipes are rotated with the middle thereof bent and repeatedly subjected to tensile and compression forces while being rotated. In order to address this, structures having resistance for a compression load are proposed. For example, Patent Literature 1 proposes a structure in which deformation of the pin seal is limited within an elastic region in a compressed state by setting the length of a seal lip of the pin to equal to or greater than 140 times the length of the gap in a direction of the axis of pipe between male and female threads, which are screwed together.

CITATION LIST

Patent Literature

PTL 1: Japanese Patent No. 4924614

SUMMARY

Technical Problem

Meanwhile, significant plastic deformation occurs in a box included in a threaded joint due to repeated application of tensile and compression loads. This may lead to degradation of sealability and, in the worst case, lead to rapture. Although a means for suppressing deformation of the pin seal has been proposed in a related art such as Patent Literature 1, there remains a problem in that a method of solving the above-described problem caused by deformation on the box side has not been proposed.

It is an object of disclosed embodiments to solve the above-described problem and provide a threaded joint for pipes having good galling resistance, in which the plastic deformation is unlikely to occur on the box side even when tensile and compression loads are repeatedly applied to pipes.

Solution to Problem

Disclosed embodiments solve the above-described problem as follows.

(1) A threaded joint for pipes including;
a pin that has a male thread and a nose provided at a tip end of the male thread, and
a box that has a female thread and a nose facing the nose of the pin,
wherein
the female thread and the male thread of the pin are screwed together,
a pin shoulder located on a tip end surface of the nose of the pin and a box shoulder that serves as a shoulder of the box and faces the pin shoulder are in contact with each other in an axial direction,
an outer circumferential surface of the nose of the pin is formed by a convex curve surface and an inner surface of the box facing the convex curve surface is formed by a tapered region, and
a pin seal in the convex curve surface and a box seal in the tapered region are in metal-to-metal contact with each other in the radial direction so as to seal the threaded joint for pipes against a fluid,
characterized in that the relationship $0.05$ degrees $\leq \theta_{sb} - \theta_{sp} \leq 2.0$ degrees is satisfied, where $\theta_{sb}$ is an angle of an insertion surface of the female thread on the box side relative to a plane perpendicular to an axis of pipe, and $\theta_{sp}$ is an angle of an insertion surface of the male thread, which faces the insertion surface of the female thread, on the pin side relative to the plane perpendicular to the axis of pipe.

(2) The threaded joint for pipes according to (1) described above, characterized in that Rlf, which is the radius of curvature R of a corner connecting a plane of loading of the female thread to a bottom surface of the female thread on the box side, is equal to or greater than 0.5 mm and equal to or smaller than 1.5 mm.

(3) The threaded joint for pipes according to (1) or (2) described above, characterized in that Rsf, which is the radius of curvature R of a corner connecting the insertion surface of the female thread to the bottom surface of the female thread on the box side, is equal to or greater than 0.5 mm and equal to or smaller than 1.5 mm.

(4) The threaded joint for pipes according to any one (1) to (3) described above, characterized in that the convex curve surface that includes the pin seal has an arc shape in a sectional view in the direction of the axis of pipe.

(5) The threaded joint for pipes according to any one of (1) to (4) described above, characterized in that a seal taper angle θseal, which is an angle of the tapered region that includes the box seal relative to the axis of pipe, is equal to or greater than 2 degrees and equal to or smaller than 15 degrees.

(6) The threaded joint for pipes according to (5) described above, characterized in that the seal taper angle θseal is equal to or greater than 2 degrees and equal to or smaller than 5 degrees.

Advantageous Effects

According to disclosed embodiments, the threaded joint for pipes having good galling resistance is obtained, in which the plastic deformation is unlikely to occur on the box side even when tensile and compression loads are repeatedly applied to pipes.

DETAILED DESCRIPTION

Figure 1:
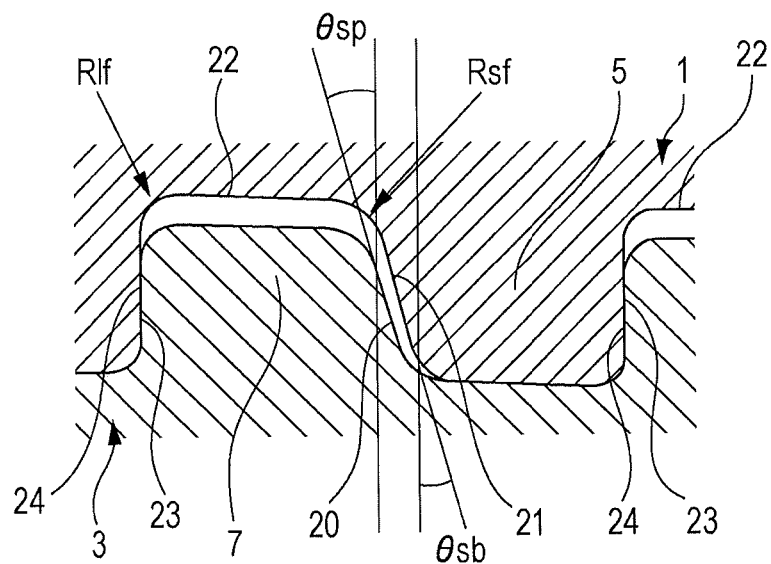
FIG. 1 is a sectional view in the direction of the axis of pipe of a region around the position where male and female threads are screwed together of an example of embodiment according to an embodiment.
Figure 2:
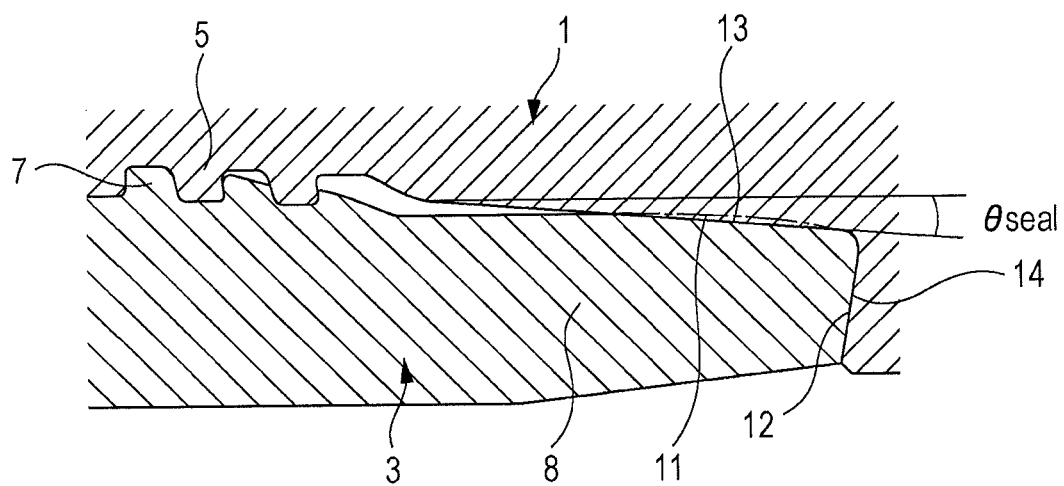
FIG. 2 is a sectional view in the direction of the axis of pipe of a region around the nose of an example of embodiment according to an embodiment.
Figure 3:
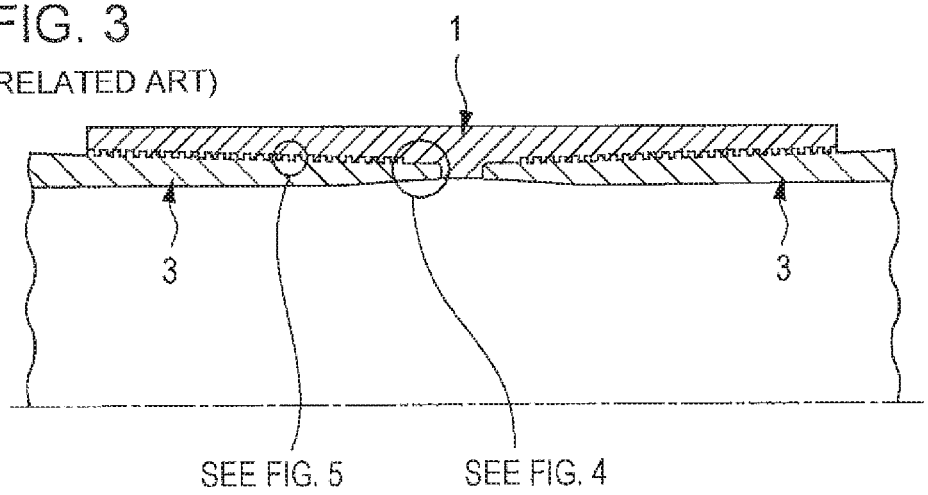
FIG. 3 is a schematic diagram (sectional view in the direction of the axis of pipe) illustrating an example of a related-art coupling type premium joint for OCTG.
Figure 4:
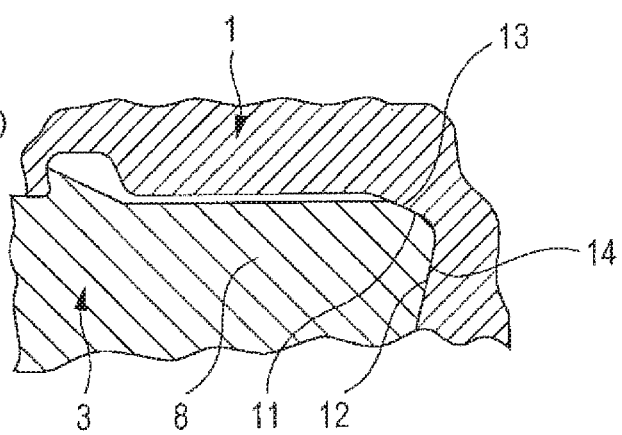
FIG. 4 is a sectional view in the direction of the axis of pipe of the region around the nose illustrated in FIG. 3.
Figure 5:
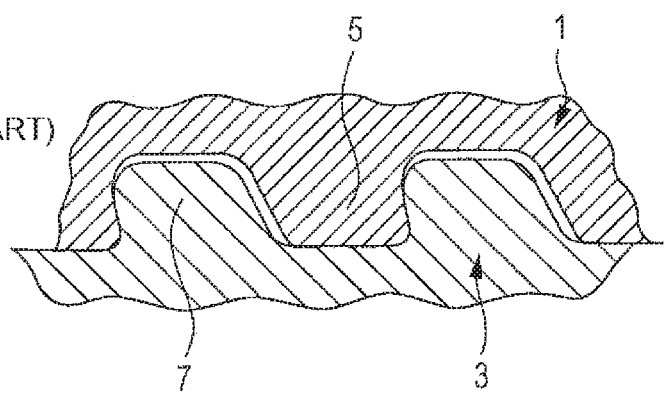
FIG. 5 is a sectional view in the direction of the axis of pipe of the region around the position where male and female threads are screwed together illustrated in FIG. 3.

FIGS. 1 and 2 are sectional views in the direction of the axis of pipe of an example of embodiments. FIG. 1 illustrates a region around the position where male and female threads are screwed together, and FIG. 2 illustrates a region around the nose. In FIGS. 1 and 2, 20 denotes an insertion surface of a male thread on a pin side, 21 denotes an insertion surface of a female thread on a box side, 22 denotes a bottom surface of the female thread on the box side, 23 denotes a plane of loading of the male thread on the pin side, and 24 denotes a plane of loading of the female thread on the box side. Elements that are the same as or equal to those in the aforementioned drawings are denoted by the same reference signs and description thereof is omitted.

As illustrated in FIGS. 1 and 2, it is assumed that the threaded joint for pipes according to embodiments has the following structure: the threaded joint for pipes includes a pin 3 and a box 1; the pin 3 has a male thread 7 and a nose 8 provided at a tip end of the male thread 7; the box 1 has a female thread 5 and a nose facing the nose 8 of the pin 3; the female thread 5 and the male thread 7 of the pin 3 are screwed together; a pin shoulder 12, which is located on a tip end surface of the nose 8 of the pin 3, and a box shoulder 14, which serves as a shoulder of the box and faces the pin shoulder 12, are in contact with each other in the axial direction; an outer circumferential surface of the nose 8 of the pin 3 is formed by a convex curve surface; an inner surface of the box 1 facing the convex curve surface is formed by a tapered region; and a pin seal 11 in the convex curve surface and a box seal 13 in the tapered region are in metal-to-metal contact with each other in the radial direction so as to seal the threaded joint for pipes against a fluid.

According to the studies performed by the inventors, in the threaded joint for pipes assumed as described above, the accumulation of strain due to plastic deformation is largest at a corner connecting the plane of loading of the female thread 24 to the bottom surface of the female thread 22 on the box 1 side. The accumulation of strain is second largest at a corner connecting the insertion surface of the female thread 21 to the bottom surface of the female thread 22 on the box 1 side. In order to prevent unusual deformation or rupture occurring when installing pipes in directional wells or in horizontal wells, it is important to reduce the strain in these corners.

As a result of further studies by the inventors, it has been found that the strain accumulated in the corner between the plane of loading of the female thread 24 and the bottom surface of the female thread 22 on the box 1 side can be reduced by limiting angles so as to satisfy the following relationship: 0.05 degrees≤θsb−θsp, where θsb is an angle of the insertion surface of the female thread 21 on the box 1 side relative to a plane perpendicular to the axis of pipe, and θsp is an angle of the insertion surface of the male thread 20, which faces the insertion surface of the female thread 21, on the pin 3 side relative to the plane perpendicular to the axis of the pipe. With this setting, when a compression load is applied, contact of the insertion surface of the female thread 5 on the box 1 side with the oppositely facing insertion surface of the male thread on the pin 3 side, begins from an end of the insertion surface of the female thread 21 on the box 1 side, the end located on the bottom surface of the female thread 22 side. This reduces a moment acting on the corner between the plane of loading of the female thread 24 and the bottom surface of the female thread 22 on the box 1 side, wherein the plane of loading and the bottom surface are adjacent to each other with a ridge of the female thread on the box 1 side interposed therebetween.

However, in the case where the $\theta_{sb}-\theta_{sp}$ is excessively large, when the pin 3 and the box 1 are tightened to each other, a ridge side of the male thread of the pin 3 and a root side of the female thread of the box 1 are in contact with each other excessively tightly on both the insertion surfaces. This leads to frequent occurrence of galling. In order to prevent this, the following relationship needs to be satisfied: $\theta_{sb}-\theta_{sp}$≤2.0 degrees, and more preferably, $\theta_{sb}-\theta_{sp}$≤1.60 degrees. The convex curve surface that includes the pin seal preferably has an arc shape (arc shape having a chord inside the pin 1) in a sectional view in the direction of the axis of pipe from the viewpoint of ease of thread cutting.

As Rlf increases, the accumulation of strain is effectively reduced. Here, Rlf is the radius of curvature R of the corner connecting the plane of loading of the female thread 24 to the bottom surface of the female thread 22 on the box 1 side. However, when Rlf is excessively large, local plastic deformation is caused by an insufficient linear portion, which is in contact with an facing plane of loading of the male thread 23 on the pin 3 side so as to receive a tensile load. Thus, Rlf is preferably equal to or greater than 0.5 mm and equal to or smaller than 1.5 mm. More preferably, Rlf is equal to or greater than 0.6 mm and equal to or smaller than 1.1 mm.

Likewise, Rsf, which is the radius of curvature R of the corner connecting the insertion surface of the female thread 21 to the bottom surface of the female thread 22 on the box 1 side, is preferably equal to or greater than 0.5 mm and equal to or smaller than 1.5 mm. More preferably, Rsf is equal to or greater than 0.6 mm and equal to or smaller than 1.1 mm.

In order to reduce adverse effects on sealability due to plastic deformation of the box 1 caused by repeated application of tensile and compression loads, the seal itself preferably has a substantially radial sealing structure. Specifically, a seal taper angle θseal, which is an angle of the tapered region that includes the box seal 13 relative to the axis of pipe, is preferably equal to or smaller than 15 degrees, and more preferably, equal to or smaller than 5 degrees. In contrast, when θseal is too small, the sliding distance of the seal during tightening is increased, thereby easily inducing galling. Thus, θseal is preferably equal to or greater than 2 degrees.

Example

A 13Cr steel pipe having an outer diameter of 9⅝ inches (244.5 mm) and a thickness of 0.545 inches (13.8 mm) (torque: 53.5 lb/ft (72.5 Nm)) and an original pipe for coupling corresponding to the steel pipe were subjected to thread cutting, thereby producing samples of the pin 3 and the box 1 under the various shape conditions shown in Table 1. The samples of the pin 3 and the box 1 respectively have the shapes illustrated in FIGS. 1 and 2 and respectively have the pin seal 11 having an arc shape in a sectional view in the direction of the axis of pipe and the box seal 13 having a tapered shape. The samples were subjected to a tightening test, which was repeated ten times. The samples in which no galling was observed in the repeated tightening test were subjected to the sealability leak test A specified in ISO 13679. The leak test was repeated three times at the maximum.

The results of the above-described tests are shown in Table 1. Referring to Table 1, no galling is observed in the repeated tightening test performed on examples according to embodiments. Also, examples according to embodiments successfully pass at least a first run of the sealability leak test without leakage. With the more preferable embodiments (No. 1 to 8 and No. 11), no leakage is observed in the three runs of the sealability leak test.

TABLE 1

| No. | θsb [deg.] | θsp [deg.] | θsb − θsp [deg.] | Rlf [mm] | Rsf [mm] | θseal [deg.] | Results of repeated tightening | Results of sealability leak test | Remarks |
|---|---|---|---|---|---|---|---|---|---|
| 1 | 15.20 | 14.80 | 0.40 | 0.6 | 1.1 | 4.8 | No galling | No leakage in 3 runs | Example |
| 2 | 15.03 | 14.97 | 0.06 | 0.6 | 1.1 | 4.8 | No galling | No leakage in 3 runs | Example |
| 3 | 15.80 | 14.20 | 1.60 | 0.6 | 1.1 | 4.8 | No galling | No leakage in 3 runs | Example |
| 4 | 15.20 | 14.80 | 0.40 | 0.6 | 0.6 | 4.8 | No galling | No leakage in 3 runs | Example |
| 5 | 25.20 | 24.80 | 0.40 | 0.6 | 1.1 | 4.8 | No galling | No leakage in 3 runs | Example |
| 6 | 25.20 | 24.80 | 0.40 | 0.6 | 1.1 | 3.5 | No galling | No leakage in 3 runs | Example |
| 7 | 15.20 | 14.80 | 0.40 | 0.6 | 1.1 | 9.6 | No galling | No leakage in 3 runs | Example |
| 8 | 15.20 | 14.80 | 0.40 | 0.6 | 1.1 | 2.5 | No galling | No leakage in 3 runs | Example |
| 9 | 15.20 | 14.80 | 0.40 | 0.4 | 1.1 | 4.8 | No galling | Leakage in 2nd run | Example |
| 10 | 15.20 | 14.80 | 0.40 | 0.6 | 0.3 | 4.8 | No galling | Leakage in 3rd run | Example |
| 11 | 15.20 | 14.80 | 0.40 | 0.6 | 1.1 | 12.0 | No galling | No leakage in 3 runs | Example |
| 12 | 15.00 | 15.00 | 0.00 | 0.6 | 1.1 | 4.8 | No galling | Leakage in 1st run | Comparative example |
| 13 | 16.50 | 13.50 | 3.00 | 0.6 | 1.1 | 4.8 | Galling in thread | — | Comparative example |

REFERENCE SIGNS LIST

1 box
3 pin
5 female thread
7 male thread
8 nose
11 metal-to-metal seal (pin seal)
12 torque shoulder (pin shoulder)
13 metal-to-metal seal (box seal)
14 torque shoulder (box shoulder)
20 insertion surface of a male thread (located on a pin side)
21 insertion surface of a female thread (located on a box side)
22 bottom surface of a female thread (located on a box side)
23 plane of loading of a male thread (located on a pin side)
24 plane of loading of a female thread (located on a box side)

The invention claimed is:

1. A threaded joint for pipes, the threaded joint comprising:
   a pin having (i) a male thread, (ii) a nose provided at a tip end of the male thread, an outer circumferential surface of the nose being formed by a convex curve surface, (iii) a shoulder located on a tip end surface of the nose, and (iv) a seal provided in the convex curve surface; and
   a box having (i) a female thread, (ii) a nose facing the nose of the pin, (iii) a shoulder configured to face the pin shoulder, (iv) an inner surface formed by a tapered region, the inner surface configured to face the convex curve surface, and (v) a seal provided in the tapered region;
   wherein the female thread of the box and the male thread of the pin are configured to be screwed together,
   the pin shoulder and the box shoulder are configured to contact each other in an axial direction, and the pin seal and the box seal are configured to be in metal-to-metal contact with each other in a radial direction so as to seal the threaded joint against a fluid, a relationship 0.05 degrees≤θsb−θsp≤2.0 degrees is satisfied, where θsb is an angle of an insertion surface of the female thread on the box side relative to a place perpendicular to an axis of a pipe, and θsp is an angle of an insertion surface of the male thread, which faces the insertion surface of the female thread, on the pin side relative to the plane perpendicular to the axis of the pipe, and Rsf, which is the radius of curvature R of a corner connecting the insertion surface of the female thread to the bottom surface of the female thread on the box side, is in the range of 0.5 mm to 1.5 mm, and Rlf, which is the radius of curvature R of a corner connecting a plane of loading of the female thread to a bottom surface of the female thread on the box side, is in the range of 0.5 mm to 1.5 mm.

2. The threaded joint for pipes according to claim 1, wherein the convex curve surface that includes the pin seal has an arc shape in a sectional view in the direction of the axis of pipe.

3. The threaded joint for pipes according to claim 2, wherein a seal taper angle θseal, which is an angle of the tapered region that includes the box seal relative to the axis of the pipe, is in the range of 2 degrees to 15 degrees.

4. The threaded joint for pipes according to claim 3, wherein the seal taper angle θseal is in the range of 2 degrees to 5 degrees.

5. The threaded joint for pipes according to claim 1, wherein a seal taper angle θseal, which is an angle of the tapered region that includes the box seal relative to the axis of the pipe, is in the range of 2 degrees to 15 degrees.

6. The threaded joint for pipes according to claim 5, wherein the seal taper angle θseal is in the range of 2 degrees to 5 degrees.

* * * * *